(12) United States Patent
Froman et al.

(10) Patent No.: US 6,714,135 B2
(45) Date of Patent: Mar. 30, 2004

(54) COLLECTIVE HEAD BEARING MONITOR

(75) Inventors: Gary Scott Froman, Ft. Worth, TX (US); Joseph Wendelsdorf, Arlington, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 10/010,105

(22) Filed: Nov. 8, 2001

(65) Prior Publication Data
US 2003/0085812 A1 May 8, 2003

(51) Int. Cl.$^7$ ................................................ G08B 21/00
(52) U.S. Cl. ........................ 340/682; 340/679; 340/680; 340/514; 73/593; 73/660
(58) Field of Search ................................. 340/679, 680, 340/682, 514; 73/593, 660

(56) References Cited

U.S. PATENT DOCUMENTS

| 4,479,389 | A | | 10/1984 | Anderson, III et al. | |
|---|---|---|---|---|---|
| 4,729,239 | A | * | 3/1988 | Gordon | 73/593 |
| 5,001,933 | A | | 3/1991 | Brand | |
| 5,029,477 | A | * | 7/1991 | Bambara | 73/660 |
| 5,140,858 | A | | 8/1992 | Nishimoto et al. | |
| 5,381,692 | A | * | 1/1995 | Winslow et al. | 73/593 |
| 5,955,880 | A | | 9/1999 | Beam et al. | |
| 6,526,831 | B2 | * | 3/2003 | Ben-Romdhane | 73/660 |

* cited by examiner

*Primary Examiner*—Julie Lieu
(74) *Attorney, Agent, or Firm*—James E. Walton

(57) ABSTRACT

A bearing monitor has a bearing sensor to monitor frequencies emitted by a bearing in a rotating component. The bearing sensor has an output to a processor. The processor is attached to the rotating component to process the output from the bearing sensor to a digital or logical signal, which may include determining if the output indicates that the bearing requires service.

24 Claims, 3 Drawing Sheets

COLLECTIVE HEAD BEARING MONITOR

FIELD OF THE INVENTION

The present invention relates to bearing monitors and, more particularly to, an improved bearing monitor that has a sensor and a processor attached to a rotating component of a system supported by the bearing.

BACKGROUND OF THE INVENTION

Bearings are commonly used to support rotating masses in many types of vehicles. Over the lifetime of the vehicle, bearings may endure hundreds of thousands or even millions of cycles. Eventually, bearings will fail because of repetitive cycles of stresses. Bearing failure can cause catastrophic results depending on when the bearing fails. Bearing failure in a collective head of a helicopter, for example, may cause the helicopter to crash if the bearing fails during flight.

Usually, however, bearings do not fail instantaneously. Cumulative wear gradually degrades bearing components, which may emit measurable indicators of imminent failure. It is known in the art that a worn bearing will emit vibrations in a frequency range at or above 1 KHz. Consequently, bearing monitors that trigger an alarm when a bearing emits frequencies in this range have been developed. These monitors usually have a sensing component to measure the frequency of a particular bearing and a processing component to analyze data sent from the sensing component.

Monitoring bearings in many vehicles is a relatively simple process because the bearing is fixed in the vehicle structure and the sensing component is mounted to or near the bearing. A signal from the sensing component is then sent to the processing component through wires or other direct connection. However, in aircraft having rotors, for example, the only structure available to mount a bearing monitor may be a rotating structure.

One solution that has been used to monitor bearings in rotating structures is mounting the sensing component on or near the bearing. The processing component receives the signal from the sensing component through a slip ring of the rotating structure. Although transmitting signals through the slip ring is common and usually effective, in the case of monitoring high frequencies above 1 KHz, undesirable noise generated by the rotating structure often degrades the signal from the sensing unit. Therefore, monitoring the bearing through the slip ring is unreliable and could be dangerous to the passengers and crew of the aircraft.

It would, therefore, be desirable to have an improved apparatus, method and system for monitoring bearings in rotating systems that does not require transmitting a signal through the slip ring.

SUMMARY OF THE INVENTION

The present invention is a bearing monitor that has a bearing sensor to monitor frequencies emitted by a bearing in a rotating component. The bearing sensor has an output to a processor. The processor is attached to the rotating component to process the output from the bearing sensor to output a digital or logical signal correlating to a condition of the bearing.

In one embodiment of the invention, a method of monitoring a bearing includes the step of sensing vibrations emitted by a bearing using a sensor mounted on a rotating component. The bearing sensor has an output. The method then includes the step of providing a processor attached to the rotating component to process the output from the bearing sensor to output a digital or logical signal.

In another embodiment of the invention, a system to monitor a bearing in a rotating component includes a housing that is attached to the rotating component. A bearing sensor attached to the housing monitors vibrations emitted by the bearing in the rotating component. The bearing sensor has an output. A processor attached to the rotating component processes the output from the bearing sensor outputs a digital or logical signal correlating to a bearing condition.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention is discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

In one embodiment of the invention, for example, a bearing monitor that monitors the condition of one or more bearings in a collective head of a rotor driven aircraft may be attached to the rotating collective head. Monitoring a collective head bearing using a conventional bearing monitor is not practical because conventional bearing monitors must be attached near the bearing. Typically, a conventional bearing monitor will be mounted on the stationary housing of the bearing or on the stationary structure in which the bearing is fixed. In the case of a collective head, the bearings are located internally, which precludes placement of a bearing monitor on or near the housing of the bearing. Although a conventional bearing monitor could be mounted to the collective head, the signal from the conventional monitor must be transmitted through the slip ring of the collective head. This transmission degrades the transmitted signal, which reduces or eliminates the reliability of a conventional bearing monitor.

Figure 1:
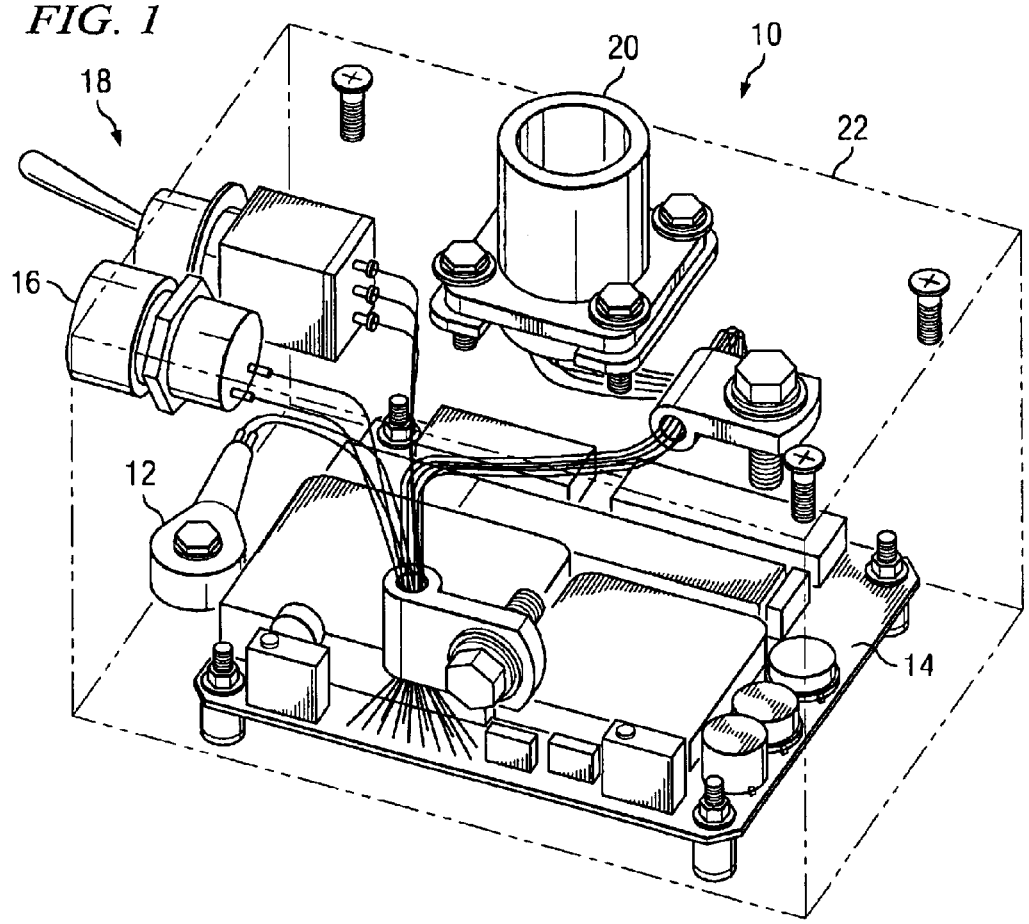
FIG. 1 is a perspective cut-away view of a bearing monitor that depicts an embodiment of the present invention.

Referring to FIG. 1, the bearing monitor 10 according to one embodiment of the present invention includes a sensor 12 and a processor 14. Although including the processor in the bearing monitor 10 increases total mass, the mass of the bearing monitor 10 is a negligible addition to the rotating mass of the collective head. If required, the mass of the bearing monitor may be balanced about the axis of the collective head.

The sensor 12 may be a piezoelectric quartz accelerometer or other instrument to measure the vibrations of the bearing. Other methods and instruments to measure vibrations emitted by the bearing will be apparent to those having ordinary skill in the art. Because a failing bearing typically emits frequencies above 1 KHz, the sensor 12 may be adjusted to monitor frequencies in that range. Additional frequencies generated by the collective head, external forces such as wind speed and air resistance, or the engine may be filtered by circuitry within the processor 14.

Information from the processor 14 may be transmitted from the processor 14 through the slip ring to a diagnostic system in the aircraft. This information may be transmitted using a 5-volt signal. Because the processor 14 is located in the rotating collective head, the signal from the sensor 12 is processed before being transmitted through the slip ring. The 5-volt signal is not degraded through the slip ring, as a raw signal from the sensor 12 would be. Consequently, processing the signal from the sensor 12 before it is transmitted from the rotating collective head is much more reliable than processing a signal that has been transmitted through the slip ring.

The processor 14 may be a printed circuit board or other electronic circuitry to monitor the output of the sensor 12. The processor 14 controls the functions of the bearing monitor 10 and may also contain diagnostic circuitry. The processor 14 analyzes the signal from the sensor 12 and outputs a digital or logical signal correlation to bearing condition, which may include determining if the bearing should be replaced. For example, if the sensor 12 detects frequencies in a selected range for a specified period of time, the processor 14 may trip an indicator 16 on the bearing monitor 10 to alert maintenance personnel of the bearing condition. The indicator 16 may visually or audibly alert maintenance personnel and will remain in a tripped condition until reset. The processor 14 may also send an alarm signal to the cockpit of the aircraft to alert the flight crew of the bearing condition.

The bearing monitor 10 may have a test circuit 18 to manually test the function of the bearing monitor 10. When activated by maintenance personnel, the test circuit 18 sends an artificially generated signal, which may simulate frequencies of a failing bearing, to the processor 14 for a specified period of time. If the bearing monitor 10 is working properly, the indicator 16 will trip because the generated signal is indicative of a failing bearing. If the indicator 16 fails to trip, the maintenance personnel may replace or repair the bearing monitor 10. If the bearing monitor 10 is functioning properly, maintenance personnel may manually reset the indicator 16 to prepare the bearing monitor 10 for operation.

The bearing monitor 10 may also have a connector 20 to interface with the aircraft. The 5-volt signal may be transmitted from the processor 14 into the connector 20 and subsequently through the slip ring to a diagnostic system in the aircraft. Although the connector 20 typically connects the bearing monitor 10 to the aircraft using a wired connection, the connector 20 may also be connected to circuitry that transmits a wireless signal. The connector 20 may also provide connections to other circuitry within the bearing monitor 10. For example, the connector may allow the flight crew to remotely activate the test circuit 18. Additionally, the connector 20 may allow the flight crew to monitor the status of the processor 14 in the bearing monitor 10.

The bearing monitor 10 may have a housing 22 that contains the sensor 12 and the processor 14 and provides mounting points for the indicator 16, the test circuit 18 and the connector 20. The housing 22 may provide a robust enclosure for the circuitry of the processor 14 and may also be weatherproof and waterproof. The indicator 16 may be mounted to the outside of the housing 22 so a tripped indicator 16 is conspicuous to an observer. A switch to activate the test circuit 18 may also be mounted on the outside of the housing 22 for easy access by maintenance personnel. The connector 20 is also mounted to the outside of the housing 22 so the bearing monitor 10 may be easily connected to other systems in the aircraft. The housing 22 may be made from a lightweight material such as carbon fiber or an aluminum alloy. Because the housing may be mounted directly to the collective head, a lightweight housing 22 is less likely to unbalance loads about the rotational axis of the collective head.

Figure 2:
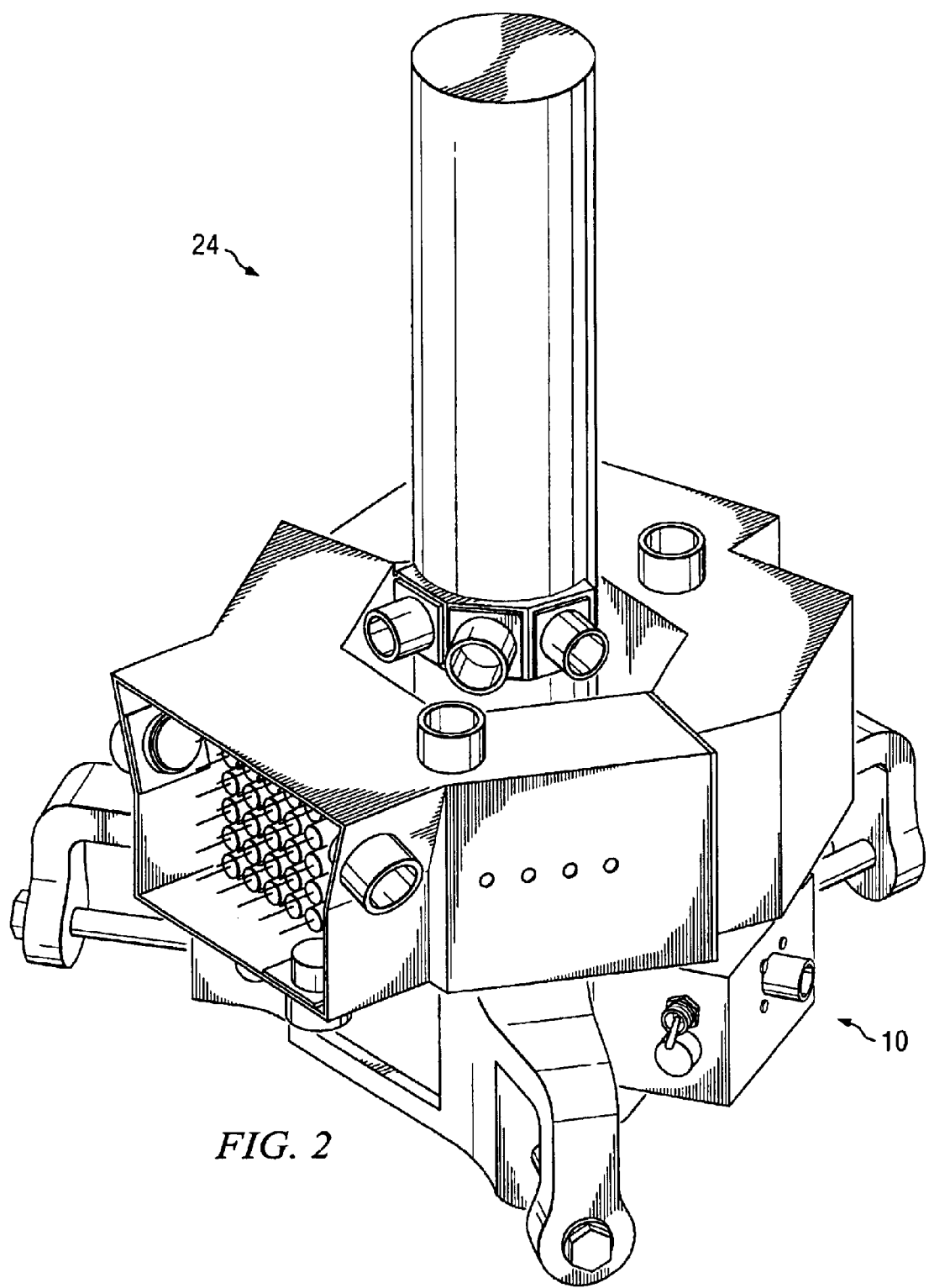
FIG. 2 is perspective view of a collective head that depicts an embodiment of the present invention.
Figure 3:
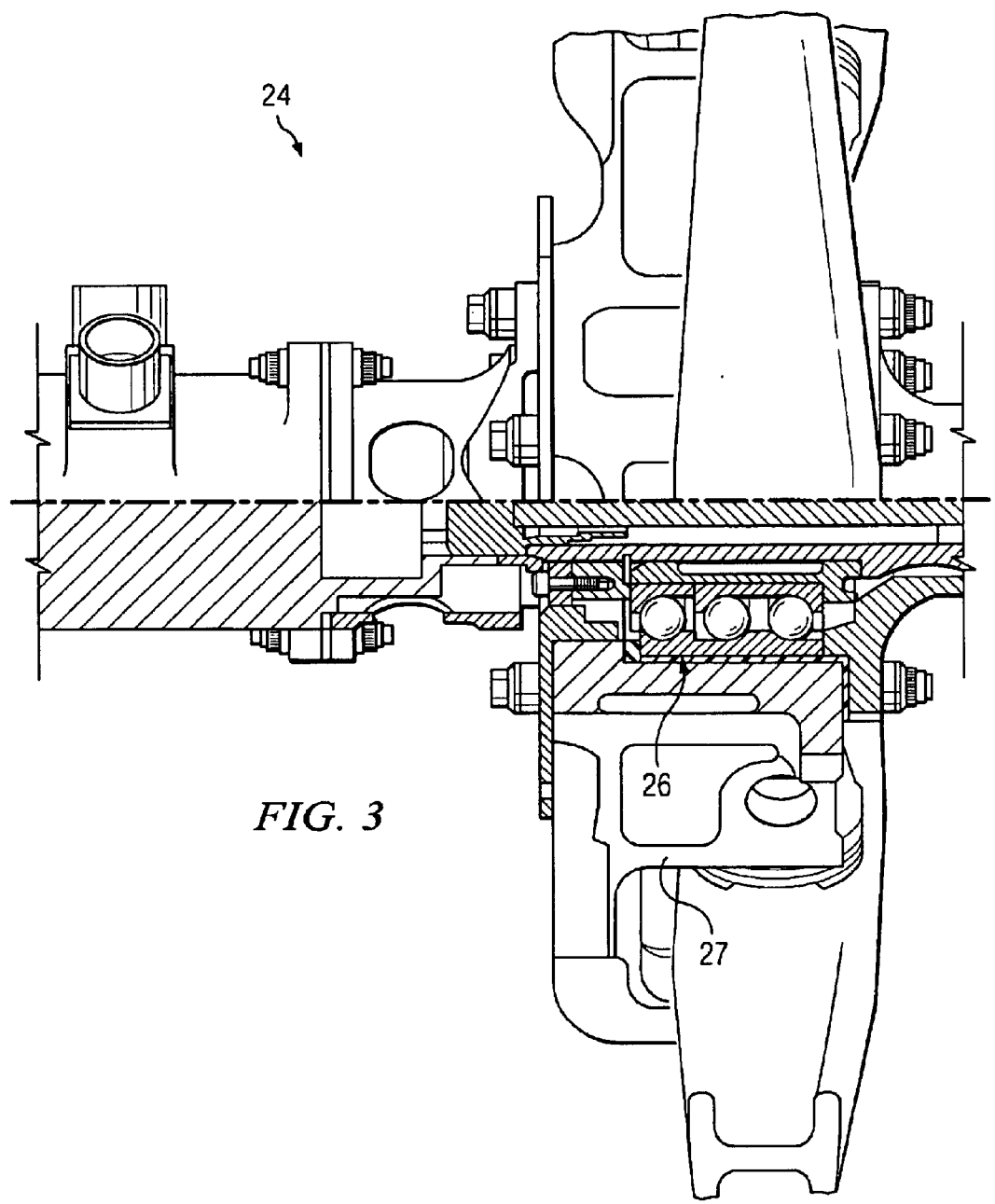
FIG. 3 is a cut-away view of a collective head that depicts an embodiment of the present invention.

Referring now to FIGS. 2 and 3, a collective head 24 of an aircraft is depicted. The collective head 24 may be in the rotor of a helicopter or the rotors of a tilt-rotor aircraft. As depicted in FIG. 2, the bearing monitor 10 may be attached directly to the collective head 24 using bolts, screws or other fasteners known to those having ordinary skill in the art. As the aircraft engines rotate the rotors, the collective head 24 also rotates. In addition to the bearing monitor 10, the collective head may also house or support electronic components and circuitry or mechanical linkages that aid sustained flight.

As depicted more clearly in FIG. 3, the collective head 24 has a bearing 26. The bearing 26 is located within the collective head 24 and supports rotation of the collective head 24 about a shaft. As discussed above, mounting the bearing monitor 10 on the bearing 26 is impractical. Consequently, the bearing monitor 10 may be mounted in a location 27 on the collective head 24. Location 27 is generally designated and not necessarily the only location that the bearing monitor 10 may be located. The bearing monitor 10 may be located at any point on the collective head 24 that will accommodate the size of the bearing monitor 10.

As the bearing 26 wears and begins to fail, vibrations in the 5–20 KHz range are emitted from the bearing 26 and are transmitted through the collective head 24. The sensor 12 in the bearing monitor 10 detects the vibrations and the processor 14 filters and analyzes the vibrations detected by the sensor 12. The indicator 16 is tripped if the processor 14 determines that the bearing 26 is failing. The processor may also output the 5-volt signal through the connector 20 and through the slip ring to trip an alarm in the cockpit.

Figure 4:
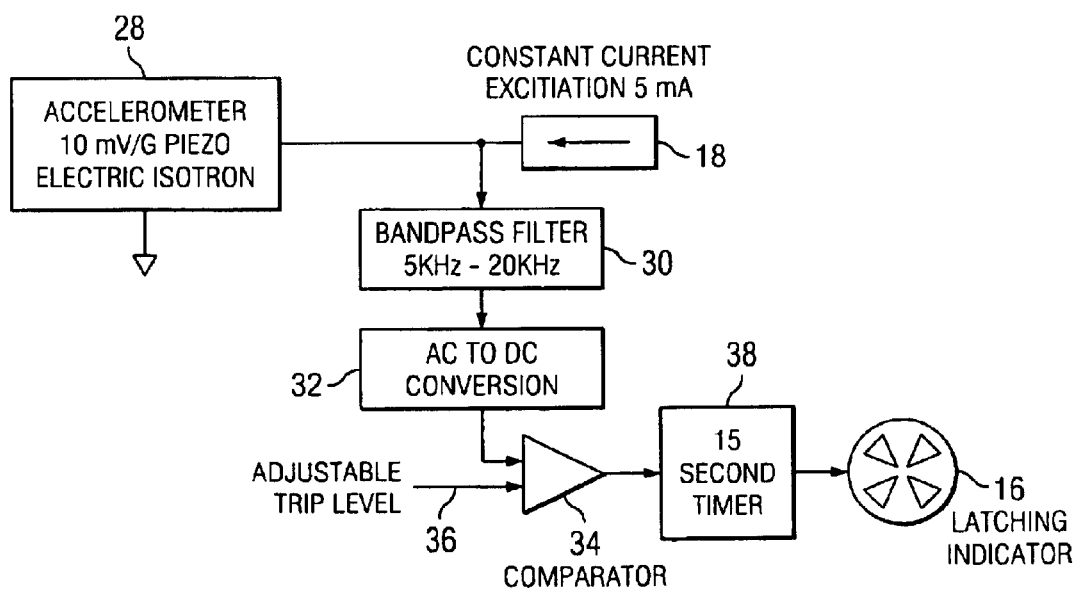
FIG. 4 is an electrical schematic diagram that depicts an embodiment of the present invention.

Referring now to FIG. 4, a schematic block diagram of the bearing monitor 10 is depicted. In this particular example, the sensor is a piezoelectric accelerometer 28. Vibrations from the environment imparted to the accelerometer 28 are converted to an electrical signal, as will be apparent to those having ordinary skill in the art. Alternatively, activating the test circuit 18 may impart an electrical current to the accelerometer 28 to self-test the bearing monitor 10. The electrical signal from the accelerometer 28 is transmitted to a bandpass filter 30 that filters frequencies in the electrical signal that do not fall within the selected frequency range.

The signal then passes through an AC/DC converter 32, which converts the alternating current signal to a direct current signal. The direct current signal then passes to a comparator 34. An adjustable trip level 36 may be imparted to the comparator 34. The adjustable trip level 36 allows maintenance personnel to set a threshold of vibration required to trip the indicator 16. For example, maintenance personnel may determine that when the bearing 26 has approximately thirty hours of service life remaining, the vibration from the bearing 26 is at a particular level. Maintenance personnel may then set the adjustable trip level 36 threshold at that particular vibration level.

The comparator 34 compares the filtered DC signal from the accelerometer 28 to the threshold. If the filtered DC signal exceeds the threshold, a timer 38 is activated. If the timer 38 detects that the threshold is exceeded for a set amount of time, fifteen seconds, for example, the indicator 16 is tripped and maintenance personnel are alerted that the bearing 26 requires maintenance. The timer 38 prevents the indicator 16 from being unnecessarily tripped if the accelerometer 28 detects intermittent vibration in the selected range. Consequently, vibration in this range that is not indicative of bearing wear does not falsely trigger the indicator 16.

Whereas the invention has been shown and described in connection with the preferred embodiment thereof, it will be understood that many modifications, substitutions and additions may be made which are within the intended broad scope of the appended claims. There has therefore been shown and described an improved bearing monitor that accomplishes at least all of the above stated advantages.

What is claimed is:

1. A bearing monitor comprising:
   a bearing sensor to monitor frequencies emitted by a bearing in a rotating component, the bearing sensor having an output; and
   a processor attached to and rotating with the rotating component to process the output from the bearing sensor and to convert the output into a digital or logical signal correlating to a condition of the bearing.

2. The bearing monitor of claim 1 wherein the bearing sensor is a piezoelectric quartz accelerometer.

3. The bearing monitor of claim 1 further comprising an indicator that alerts an operator if the bearing requires service.

4. The bearing monitor of claim 3 wherein the indicator is proximate to the processor.

5. The bearing monitor of claim 3 wherein the indicator is remote from the processor.

6. The bearing monitor of claim 3 wherein the indicator indicates a condition of the bearing after the bearing monitor receives a preset output for a period of time.

7. The bearing monitor of claim 1 wherein the processor includes a bandpass filter to filter frequencies in a selectable range.

8. The bearing monitor of claim 1 further comprising a test circuit to self-test the bearing monitor.

9. A method of monitoring a bearing comprising the steps of:
   sensing vibrations emitted by a bearing using a sensor attached to a rotating component, the bearing sensor having an output; and
   providing a processor attached to and rotating with the rotating component to process the output from the bearing sensor to a digital or logical signal correlating to a bearing condition.

10. The method of claim 9 wherein the bearing sensor is piezoelectric quartz accelerometer.

11. The method of claim 9 further comprising the step of providing an indicator that alerts an operator if the bearing requires service.

12. The method of claim 11 wherein the indicator is proximate to the processor.

13. The method of claim 11 wherein the indicator is remote from the processor.

14. The method of claim 11 wherein the indicator indicates a condition of the bearing after the processor receives a preset output for a period of time.

15. The method of claim 9 wherein the processor includes a bandpass filter to filter frequencies in a selectable range.

16. The method of claim 9 wherein the processor includes a test circuit.

17. A system to monitor a bearing in a rotating component comprising:
   a bearing sensor attached to the rotating component to monitor frequencies emitted by the bearing in the rotating component, the bearing sensor having an output; and
   a processor attached to and rotating with the rotating component to process the output from the bearing sensor and to convert the output into a digital or logical signal correlating to a condition of the bearing.

18. The system of claim 17 wherein the bearing sensor is a piezoelectric quartz accelerometer.

19. The system of claim 17 further comprising an indicator that alerts a user if the bearing requires service.

20. The system of claim 19 wherein the indicator is proximate to the processor.

21. The system of claim 19 wherein the indicator is remote from the rotating component.

22. The system of claim 19 wherein the indicator indicates a condition of the bearing after the bearing monitor receives a preset output for a period of time.

23. The system of claim 17 wherein the processor includes a bandpass filter to filter frequencies in a selectable range.

24. The system of claim 17 further comprising a test circuit to self-test the bearing monitor.

* * * * *